United States Patent
Tamilselvam et al.

(10) Patent No.: US 12,277,507 B2
(45) Date of Patent: Apr. 15, 2025

(54) FACTCHECKING ARTIFICIAL INTELLIGENCE MODELS USING BLOCKCHAIN

(71) Applicant: International Business Machines Corporation, Armonk, NY (US)

(72) Inventors: Srikanth Govindaraj Tamilselvam, Chennai (IN); Sai Koti Reddy Danda, Narasaraopet (IN); Senthil Kumar Kumarasamy Mani, Bangalore (IN); Kalapriya Kannan, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 17/155,342

(22) Filed: Jan. 22, 2021

(65) Prior Publication Data
US 2022/0237477 A1 Jul. 28, 2022

(51) Int. Cl.
*G06N 5/04* (2023.01)
*G06F 16/23* (2019.01)
*G06N 20/00* (2019.01)

(52) U.S. Cl.
CPC ........... *G06N 5/04* (2013.01); *G06F 16/2379* (2019.01); *G06N 20/00* (2019.01)

(58) Field of Classification Search
CPC ............ G06N 20/00; G06N 3/08; G06N 5/04; G06N 5/045; H04L 9/50; G06F 16/2379
See application file for complete search history.

(56) References Cited

U.S. PATENT DOCUMENTS 11,128,737 B1 * 9/2021 Fox .................... G06F 18/29
2019/0012595 A1 * 1/2019 Beser .................. G06N 3/08
(Continued)

FOREIGN PATENT DOCUMENTS

CN       109615015 A    *  4/2019
WO       2017120579        7/2017

OTHER PUBLICATIONS

Nassar, Mohamed, et al. "Blockchain for explainable and trustworthy artificial intelligence." Wiley Interdisciplinary Reviews: Data Mining and Knowledge Discovery 10.1 (2020): e1340, DOI: 10.1002/widm.1340 (Year: 2020).*

(Continued)

*Primary Examiner* — Andrew L Tank
(74) *Attorney, Agent, or Firm* — Ryan, Mason & Lewis, LLP

(57) ABSTRACT

Methods, systems, and computer program products for factchecking artificial intelligence models using blockchain are provided herein. A computer-implemented method includes obtaining at least one artificial intelligence model and at least one set of data related to the at least one artificial intelligence model; determining a set of characteristics based at least in part on the at least one artificial intelligence model and the at least one set of data; selecting one of a plurality of networks based at least in part on a target deployment of the at least one artificial intelligence model to verify the set of characteristics; generating a report based at least in part on verifying the set of characteristics using the selected network, wherein the report establishes a threshold level of trust for the at least one artificial intelligence model; and storing the report on a blockchain.

20 Claims, 7 Drawing Sheets

(56) References Cited

U.S. PATENT DOCUMENTS

| | | | |
|---|---|---|---|
| 2019/0036712 A1* | 1/2019 | Qiu | G06Q 20/38215 |
| 2019/0121889 A1* | 4/2019 | Gold | G06T 1/20 |
| 2019/0228006 A1* | 7/2019 | Tormasov | H04L 9/3239 |
| 2019/0278666 A1* | 9/2019 | Lin | G06F 11/1464 |
| 2019/0280918 A1* | 9/2019 | Hermoni | H04L 41/069 |
| 2019/0287026 A1* | 9/2019 | Calmon | G06N 20/00 |
| 2019/0340518 A1* | 11/2019 | Merrill | G06F 40/56 |
| 2020/0074052 A1* | 3/2020 | Cunico | G06F 40/205 |
| 2020/0133955 A1* | 4/2020 | Padmanabhan | G06Q 30/01 |
| 2020/0252205 A1* | 8/2020 | Padmanabhan | G06F 16/24564 |
| 2020/0294128 A1* | 9/2020 | Cella | H04L 9/3239 |
| 2020/0302318 A1* | 9/2020 | Hetherington | G06N 20/20 |
| 2020/0311583 A1* | 10/2020 | Manamohan | G06N 20/00 |
| 2021/0027136 A1* | 1/2021 | Hwang | G06F 9/542 |
| 2021/0133162 A1* | 5/2021 | Arnold | G06N 20/00 |
| 2021/0150411 A1* | 5/2021 | Coenders | G06F 21/53 |
| 2021/0158229 A1* | 5/2021 | Danda | H04L 9/50 |
| 2021/0241149 A1* | 8/2021 | Carlson | G06N 5/043 |
| 2021/0248514 A1* | 8/2021 | Cella | G06V 20/20 |
| 2021/0258160 A1* | 8/2021 | Kannan | H04L 9/32 |
| 2021/0263908 A1* | 8/2021 | Saito | H04L 9/3239 |
| 2021/0334895 A1* | 10/2021 | Kumar | G06N 20/00 |
| 2022/0019901 A1* | 1/2022 | Saleh | H04L 9/50 |
| 2022/0050825 A1* | 2/2022 | Ramasamy | G06N 20/10 |
| 2022/0092056 A1* | 3/2022 | Sekar | G06Q 10/10 |
| 2022/0094544 A1* | 3/2022 | Sekar | G06Q 10/10 |
| 2022/0138550 A1* | 5/2022 | Zhang | G06N 3/063 706/25 |
| 2022/0179843 A1* | 6/2022 | Irazabal | G06F 16/2379 |
| 2022/0198304 A1* | 6/2022 | Szczepanik | H04L 63/12 |

OTHER PUBLICATIONS

Z. Shae and J. Tsai, "AI Blockchain Platform for Trusting News," 2019 IEEE 39th International Conference on Distributed Computing Systems (ICDCS), Dallas, TX, USA, 2019, pp. 1610-1619, doi: 10.1109/ICDCS.2019.00160. (Year: 2019).*

J. D. Harris and B. Waggoner, "Decentralized and Collaborative AI on Blockchain," 2019 IEEE International Conference on Blockchain (Blockchain), Atlanta, GA, USA, 2019, pp. 368-375, doi: 10.1109/Blockchain.2019.00057. (Year: 2019).*

K. Salah, M. H. U. Rehman, N. Nizamuddin and A. Al-Fuqaha, "Blockchain for AI: Review and Open Research Challenges," in IEEE Access, vol. 7, pp. 10127-10149, 2019, doi: 10.1109/ACCESS.2018.2890507. (Year: 2019).*

Mamoshina et al., Converging blockchain and next-generation artificial intelligence technologies to decentralize and accelerate biomedical research and healthcare. Oncotarget. Nov. 9, 2017;9(5):5665-5690. doi: 10.18632/oncotarget.22345. (Year: 2017).*

Brundage, Miles, et al. "Toward trustworthy AI development: mechanisms for supporting verifiable claims." arXiv preprint arXiv:2004.07213 (2020). (Year: 2020).*

Richards, John, et al. "A methodology for creating AI FactSheets." arXiv preprint arXiv:2006.13796 (2020). (Year: 2020).*

Schonander, Carl, Enhancing trust in artificial intelligence: Audits and explanations can help, CIO, available at https://www.cio.com/article/3431658/enhancing-trust-in-artificial-intelligence-auditsand-explanations-can-help.html, Aug. 13, 2019.

Mojsilovic, Aleksandra, Factsheets for AI Services, IBM Research Blog, available at https://www.ibm.com/blogs/research/2018/08/factsheets-ai/, Aug. 22, 2018.

Kilroy, Karen, How to build trust in AI with blockchain technology, IBM Client Success Field Notes, available at https://www.ibm.com/blogs/client-voices/build-trust-ai-blockchain-technology/, Feb. 14, 2019.

Schmelzer, Ronald, Combination of blockchain and AI makes models more transparent, available at TechTargethttps://searchenterpriseai.techtarget.com/feature/Combination-of-blockchain-and-AI-makes-models-more-transparent, May 22, 2018.

Gebru, Timnit, et al., Datasheets for Datasets, available at https://arxiv.org/pdf/1803.09010.pdf, Mar. 19, 2020.

Arnold, M., et al., FactSheets: Increasing Trust in AI Services through Supplier's Declarations of Conformity, available at https://arxiv.org/pdf/1808.07261.pdf, Feb. 7, 2019.

Holstein, Kenneth, et al., Improving Fairness in Machine Learning Systems: What Do Industry Practitioners Need?, available at https://arxiv.org/pdf/1812.05239.pdf, Jan. 7, 2019.

Mell, Peter, et al., The NIST Definition of Cloud Computing, National Institute of Standards and Technology, U.S. Department of Commerce, NIST Special Publication 800-145, Sep. 2011.

* cited by examiner

| KEY | VALUE |
|---|---|
| BIAS | YES/NO |
| BIAS ENTITY | CATEGORY |
| BIAS EVIDENCE | DESCRIPTION |
| BIAS VERIFICATION METHOD | TYPE OF ALGORITHM |
| DATA SET EVIDENCE | DESCRIPTION |

FACTCHECKING ARTIFICIAL INTELLIGENCE MODELS USING BLOCKCHAIN

BACKGROUND

The present application generally relates to information technology and, more particularly, to artificial intelligence (AI) techniques.

AI models are being deployed in almost every industry; however, concerns over the explainability and trustworthiness of such models have prevented more widespread adoption, especially for critical applications.

SUMMARY

In one embodiment of the present invention, techniques for factchecking artificial intelligence models using blockchain are provided. An exemplary computer-implemented method includes steps of obtaining at least one artificial intelligence model and at least one set of data related to the at least one artificial intelligence model; determining a set of characteristics based at least in part on the at least one artificial intelligence model and the at least one set of data; selecting one of a plurality of networks based at least in part on a target deployment of the at least one artificial intelligence model to verify the set of characteristics; generating a report based at least in part on verifying the set of characteristics using the selected network, wherein the report establishes a threshold level of trust for the at least one artificial intelligence model; and storing the report on a blockchain.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is an example of a key-value format for storing data in a blockchain in accordance with exemplary embodiments;

DETAILED DESCRIPTION

There are an increasing number of attempts to improve the trustworthiness and transparency of AI models. For example, one such attempt includes publishing a datasheet with every dataset (e.g., a dataset used to train an AI model) that describes characteristics of the dataset, such as the motivation, composition, collection process, and recommended uses. Although such attempts identify areas where trust can be improved between providers and consumers of an AI model, they do not enable an external party to audit, test, or verify the AI mode, for example.

As described herein, embodiments of the present invention include a blockchain enabled validation system for AI models. According to one embodiment, the blockchain enabled validation system obtains a generates a factsheet based on an AI model and a reference dataset, which is published on a blockchain. Additionally, or alternatively, the blockchain enabled validation system obtains an AI model and reference dataset from a model builder and provides them to a regulatory authority. The regulatory authority generates a compliance report by validating whether the AI model complies with a specified set of rules and/or regulations. The compliance report is published on the blockchain.

Figure 1:
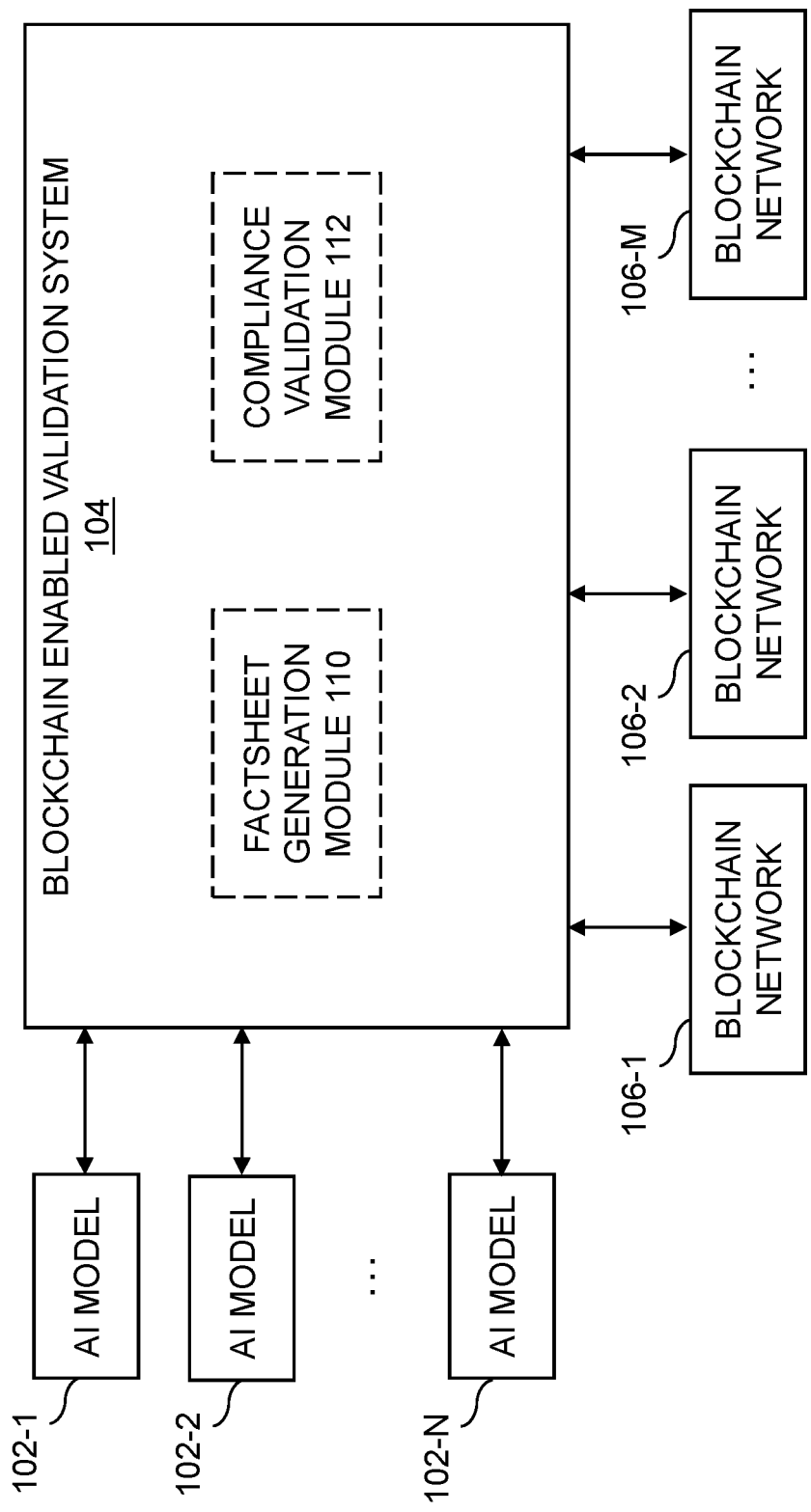
FIG. 1 is a diagram illustrating a system architecture, according to an exemplary embodiment of the invention.

FIG. 1 is a diagram illustrating a system architecture, according to an exemplary embodiment. By way of illustration, FIG. 1 depicts a blockchain enabled validation system 104, which includes a factsheet generation module 110 and/or a compliance validation module 112. In the FIG. 1 embodiment, the blockchain enabled validation system 104 obtains AI models 102-1, 102-2, . . . , 102-N (collectively referred to herein as AI models 102) from respective builders of the AI models 102. FIG. 1 also includes one or more blockchain networks 106-1, 106-2, . . . , 106-M (collectively referred to herein as blockchain networks 106). A given one of the blockchain networks 106 is described in more detail below in conjunction with FIG. 2. The blockchain enabled validation system 104 interacts with the blockchain networks 106 to generate factsheets for the AI models 102 based at least in part on factsheet generation module 110 and/or generate compliance reports of the AI models 102 based at least in part on compliance validation module 112.

Figure 2:
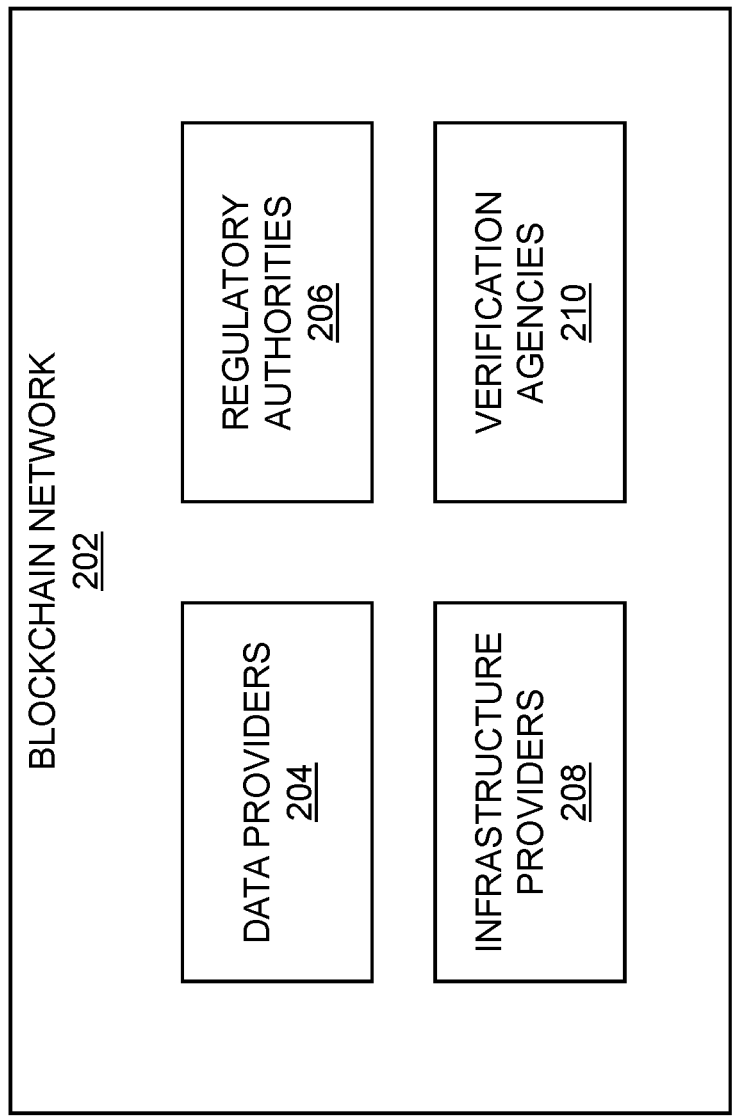
FIG. 2 is a diagram illustrating a blockchain network, according to an exemplary embodiment of the invention.

FIG. 2 shows a diagram illustrating a blockchain network 202 according to an exemplary embodiment. In the FIG. 2 embodiment, the blockchain network 202 includes various network participants, including one or more data providers 204, one or more regulatory authorities 206, one or more infrastructure providers 208, and one or more verification agencies 210.

An illustrative embodiment may include an AI model builder (e.g., corresponding to one of the AI models 102), providing an AI model along with a dataset to the blockchain enabled validation system 104. The blockchain enabled validation system 104 identifies the appropriate non-conflicting verification agencies 210 having expertise in the relevant domains (for example, field experts, professors, etc.). In at least some embodiments, the infrastructure agencies 208 provide resources (e.g., cloud resources) having suitable configurations for factchecking the AI model. The data providers 204 verify that the data being used to train the AI model is used according to any agreements associated with such data. The verification agencies 210 verify the AI model and generate a verification report, which is published on the blockchain network 202. The regulatory authorities 206 verify compliance of the AI model using the applicable regulations and rules. In accordance with some example embodiments, the regulatory authorities 206 checks for compliance based at least in part on the verification report published on the blockchain network 202.

According to at least some example embodiments, the verification report corresponds to a factsheet that includes information describing characteristics of the AI model. The factsheet may include information about the AI model service (e.g., a description of the service, release dates, and target users); whether the AI model meets appropriate obligations for protected subject matter (e.g., medical data); whether the AI model was subject to any ethical review applications, reviews, or approvals (e.g., Institutional Review Board applications); whether the dataset used to train the model complies with applicable sets of standards (e.g., the EU General Data Protection Regulation (GDPR), US Equal Employment Opportunity Act, etc.); testing methodology; or testing results. The verification report may be provided to the consumers of the AI model via the blockchain network.

One or more illustrative embodiments include the blockchain enabled validation system 104 verifying compliance of one of the AI models 102 with a set of rules or regulations in response to a transaction is initiated by an AI model verifier. In such an embodiment, the blockchain enabled validation system 104 provides the blockchain network with the regulatory authority corresponding to the set of rules or regulations for the verification. The regulatory authority then verifies that the AI model complies with the rules and regulations and publishes the compliance report on the blockchain network. In some example embodiments, the compliance report can be based at least in part on a factsheet corresponding to the AI model stored on the blockchain network.

Users of the AI model may use the published compliance report and/or verification report to, for example, verify that the AI model is compliant or decide whether to use the AI model. In one or more example embodiments, the blockchain enabled validation system 104 enables users to provide feedback to the model builder or the regulatory authorities.

It is to be appreciated that each of the blockchain networks 106 in FIG. 1 may include different sets of data providers 204, regulatory authorities 206, infrastructure providers 208, and/or verification agencies 210. For example, one of the blockchain networks 106 may be associated with GDPR compliance rules and another may be associated with US compliance rules.

Facts provided by model suppliers about an AI model are often incomplete, as model suppliers tend to focus on the specific goal of the AI model. As such, exemplary embodiments identify and assign an AI model to a network based on the target deployment, and the network participants test facts about the AI model, based on the applicable policies, in addition to any facts provided by the model supplier. Accordingly, an example embodiment includes a blockchain enabled validation system that is configured to detect relevant factsheet questions based on the impact of a given AI model, and to identify and query the relevant network participants based on the target deployment.

As a non-limiting example, assume an AI builder initially provides information about the AI model including, the data used to train the model; the algorithm used (e.g., a face detection algorithm); a claim on the metrics (e.g., accuracy of the AI model); and data lineage (e.g., how the data was collected). In such an example, the blockchain enabled validation system may include a machine learning model that is trained to identify an appropriate blockchain network to verify the claims of the AI model based on such information. Such a machine learning model can be trained (or re-trained) based on user feedback, as described in more detail elsewhere herein.

Each network may include a particular set of network participants that can generate new facts for the AI model to supplement any facts that may be provided by the AI model builder. A given set of network participants may include regulatory authorities, infrastructure providers, verification agencies, and data providers for different geographical areas, such as, for example, countries or groups of countries (e.g., European Union). The blockchain enabled validation system may generate network recommendations for particular AI models. For example, an appropriate network on the blockchain network can be identified and activated to verify a given AI model based on target deployments of the AI model and/or a set of base facts corresponding to the AI model.

One aspect of the present disclosure includes a feedback mechanism for improving the verification checks. Feedback may be provided to the blockchain enabled validation system, which may be region-specific, such as from data or model providers who can choose appropriate robustness, fairness, bias checks for the region, for example. Additionally, the blockchain enabled validation system can be configured to obtain feedback from online resources, such as from technical publications, scholarly articles, and/or the like. The blockchain enabled validation system can account for differences in the target deployments, such as, when a data provider generates new test samples to test the robustness of the AI model or changes test sample distributions to check the fairness of the AI model, for example. As such, the blockchain enabled validation system learns over time (e.g., using machine learning techniques) based on the performance of its recommendations.

Implementing a blockchain allows providers to quickly join applicable geographical networks, which can be leveraged across other networks as feedback for similar verification of new models. At least one example embodiment includes capturing the various characteristics associated with the AI model in the blockchain. The blockchain may capture information related to the data used for building the AI model, facts of the AI model that is being verified, intermediate logs, findings after the verification process (e.g., bias, fairness, or compliance information), digital signatures of the parties certifying the model, for example. The meta-information required for auditing or tracing the verification process stored in the blockchain may include a description of the method used for the verification process, and the test data used during the verification process.

Additionally, in one example embodiment, the hyperledger fabric stores the data on the blockchain in the form of key-value pairs. FIG. 3 shows a non-limiting example of a key-value format 300 for storing data in an illustrative embodiment. In this example, the format 300 includes a column of keys for bias, bias entity, bias evidence, bias verification method, and data set evidence, and the respective values for the keys. Such a format can easily be made machine readable and can also be easily verified. It is to be appreciated that this is merely one example of a format, and other formats are also possible.

Figure 4:
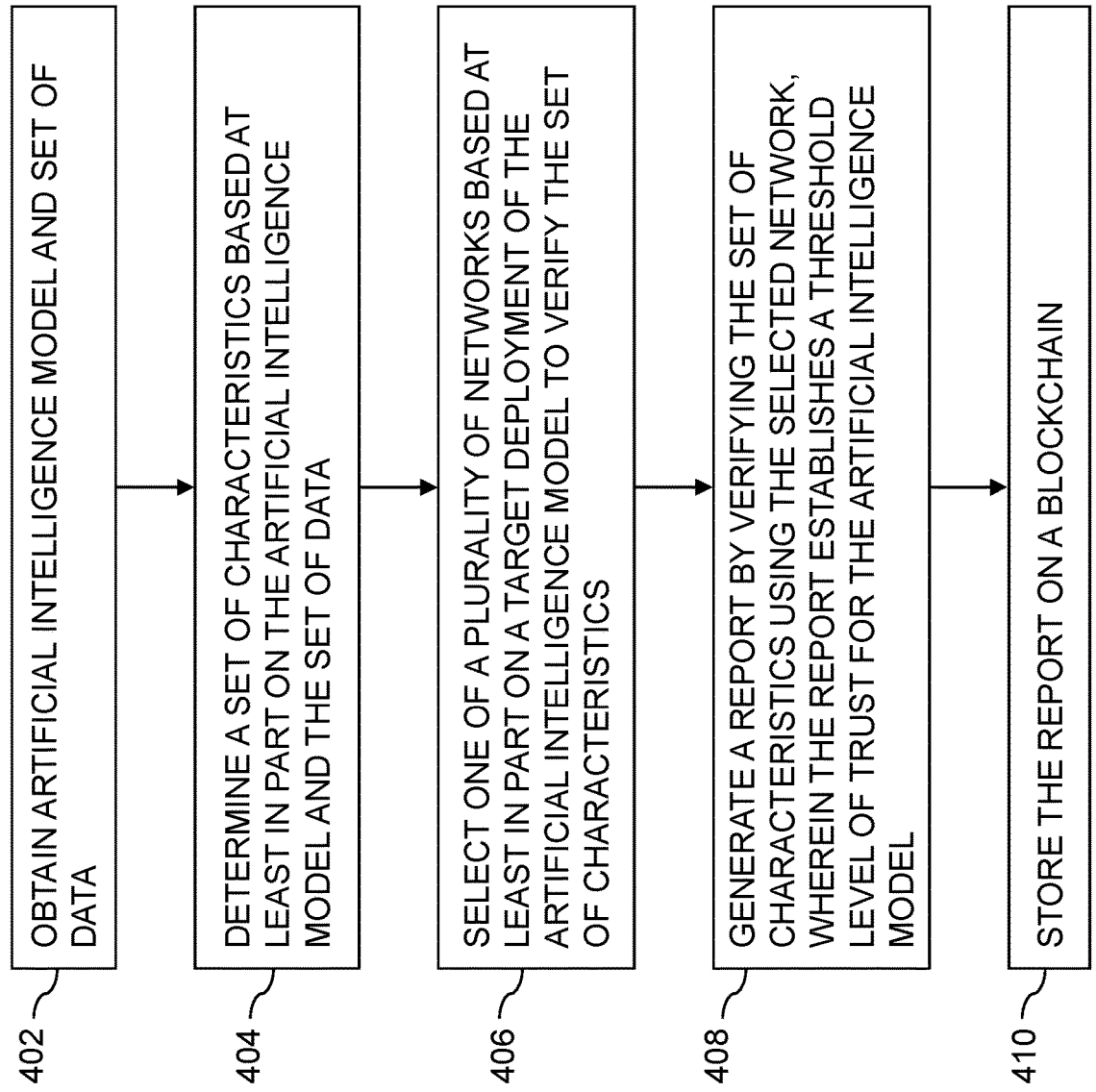
FIG. 4 is a flow diagram illustrating techniques according to an embodiment of the invention.

FIG. 4 is a flow diagram illustrating techniques according to an exemplary embodiment. The techniques shown in FIG. 4 may be performed by a blockchain enabled validation system 104 utilizing its factsheet generation module 110 and/or compliance validation module 112. Step 402 includes obtaining at least one artificial intelligence model and at least one set of data related to the at least one artificial intelligence model. Step 404 includes determining a set of characteristics based at least in part on the at least one artificial intelligence model and the at least one set of data. Step 406 includes selecting one of a plurality of networks based at least in part on a target deployment of the at least one artificial intelligence model to verify the set of characteristics. Step 408 includes generating a report based at least in part on verifying the set of characteristics using the selected network, wherein the report establishes a threshold level of trust for the at least one artificial intelligence model. Step 410 includes storing the report on a blockchain.

The determining may include determining a set of features in the at least one set of data; and determining an impact of each feature within the set on the output of the at least one artificial intelligence model. The set of characteristics comprises at least one of: a description of the at least one artificial intelligence model; whether the at least one set of data complies with a set of regulations; one or more performance metrics for the at least one artificial intelligence model; one or more test results of the at least one artificial intelligence model; one or more biases in the set of data; and a lineage of the at least one data set. The process depicted in FIG. 4 may further include the following steps: obtaining feedback related to the selected network; training a machine learning model based at least in part on the feedback; and using the trained machine learning model for selecting a network from the plurality of networks for another artificial intelligence model. Each of the plurality of networks may include one or more of the following network participants: at least one data provider that verifies the at least one dataset was used to train the artificial intelligence model; at least one regulatory authority that verifies the artificial intelligence model meets one or more specified regulations; at least one infrastructure provider that provides computing resources for verify at least a portion of the set of characteristics; and at least one verification agency that verifies capability of the at least one artificial intelligence model. The selecting may be based at least in part on the computing resources provided by infrastructure providers in at least two of the networks. Each of the plurality of networks may be associated with different geographical regions. At least a portion of the set of characteristics may be determined based on a factsheet provided by a builder of the at least one artificial intelligence model. The determining of step 404 may be based at least in part on feedback received for at least one other artificial intelligence model from another one of the plurality of networks.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
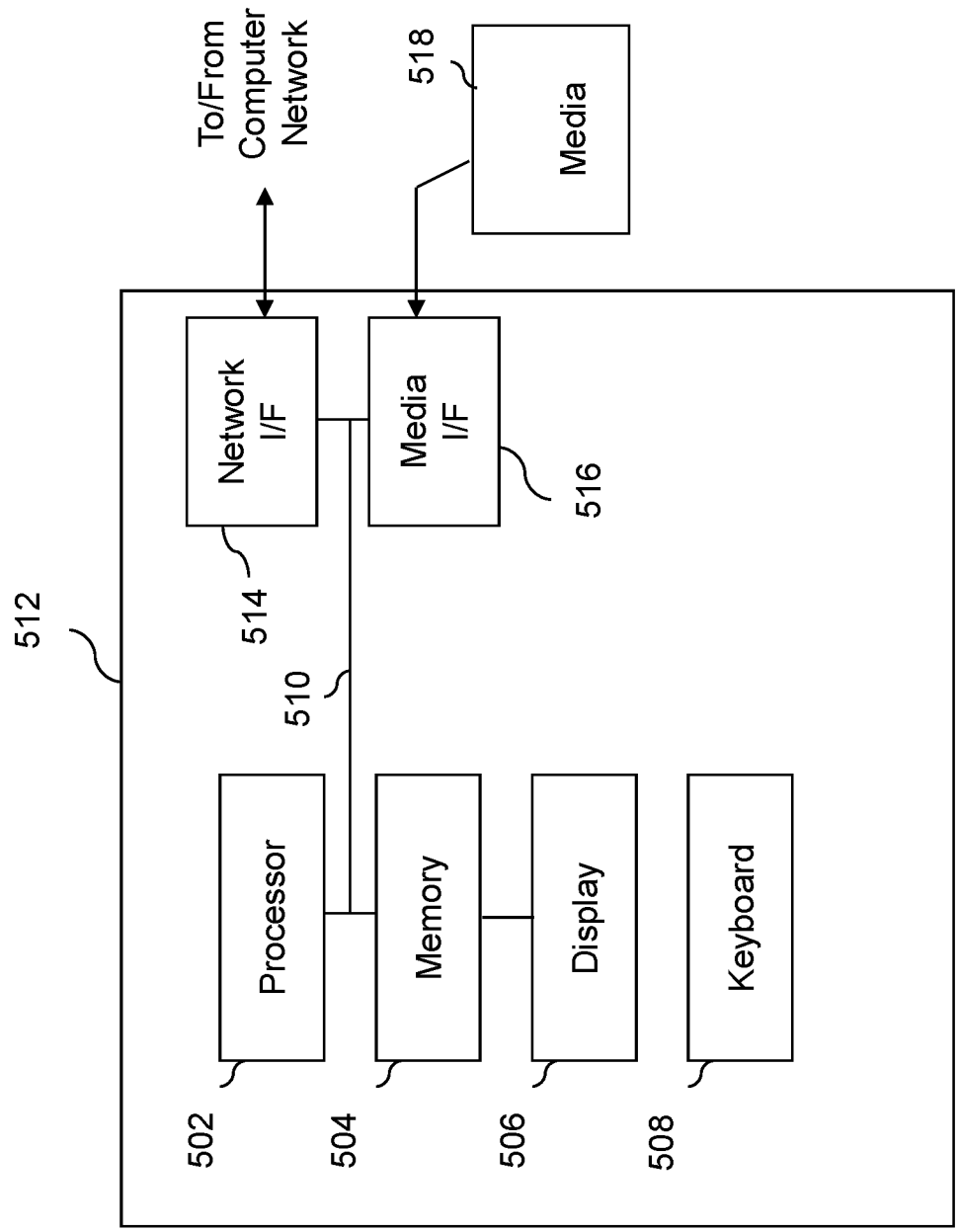
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
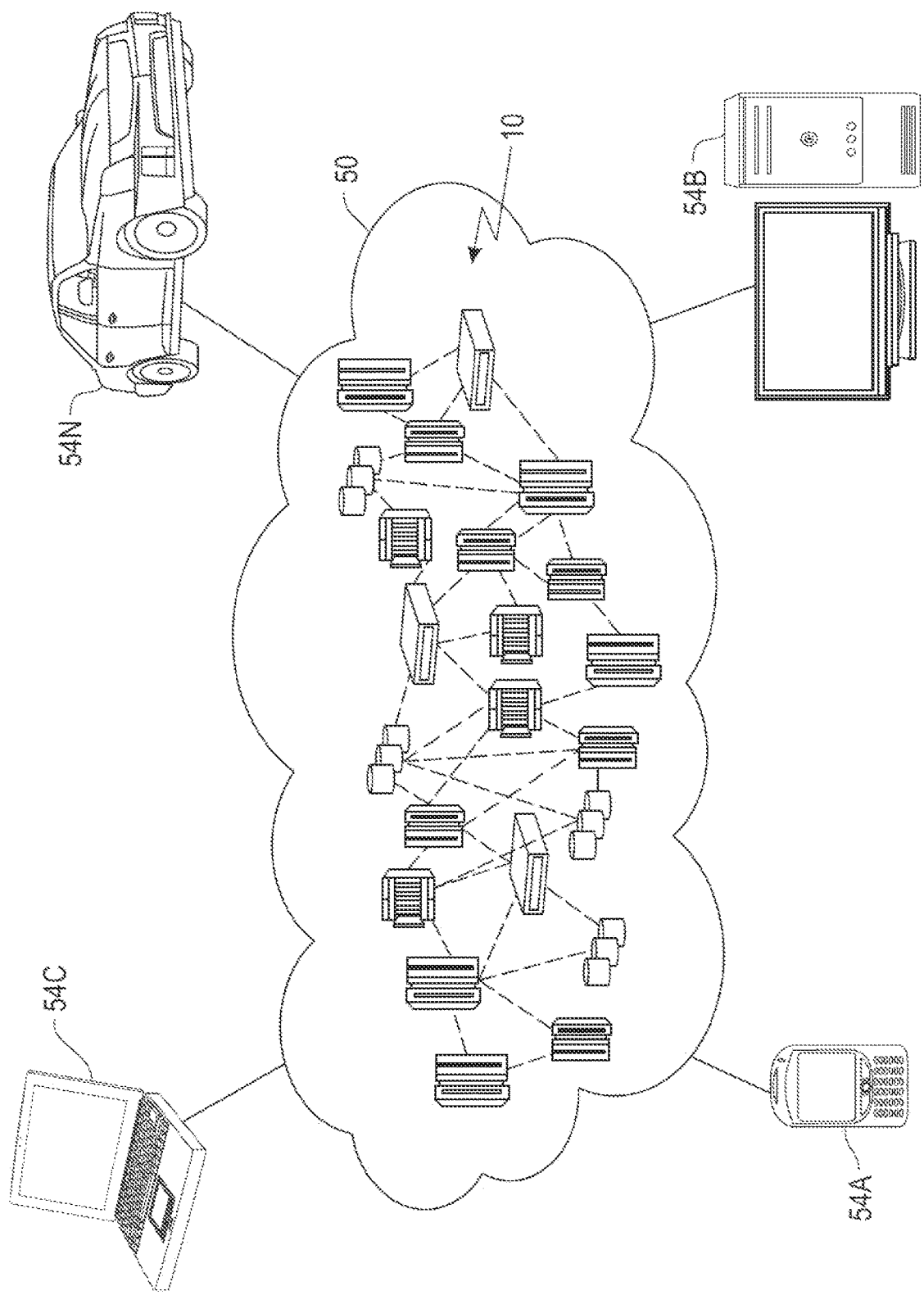
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
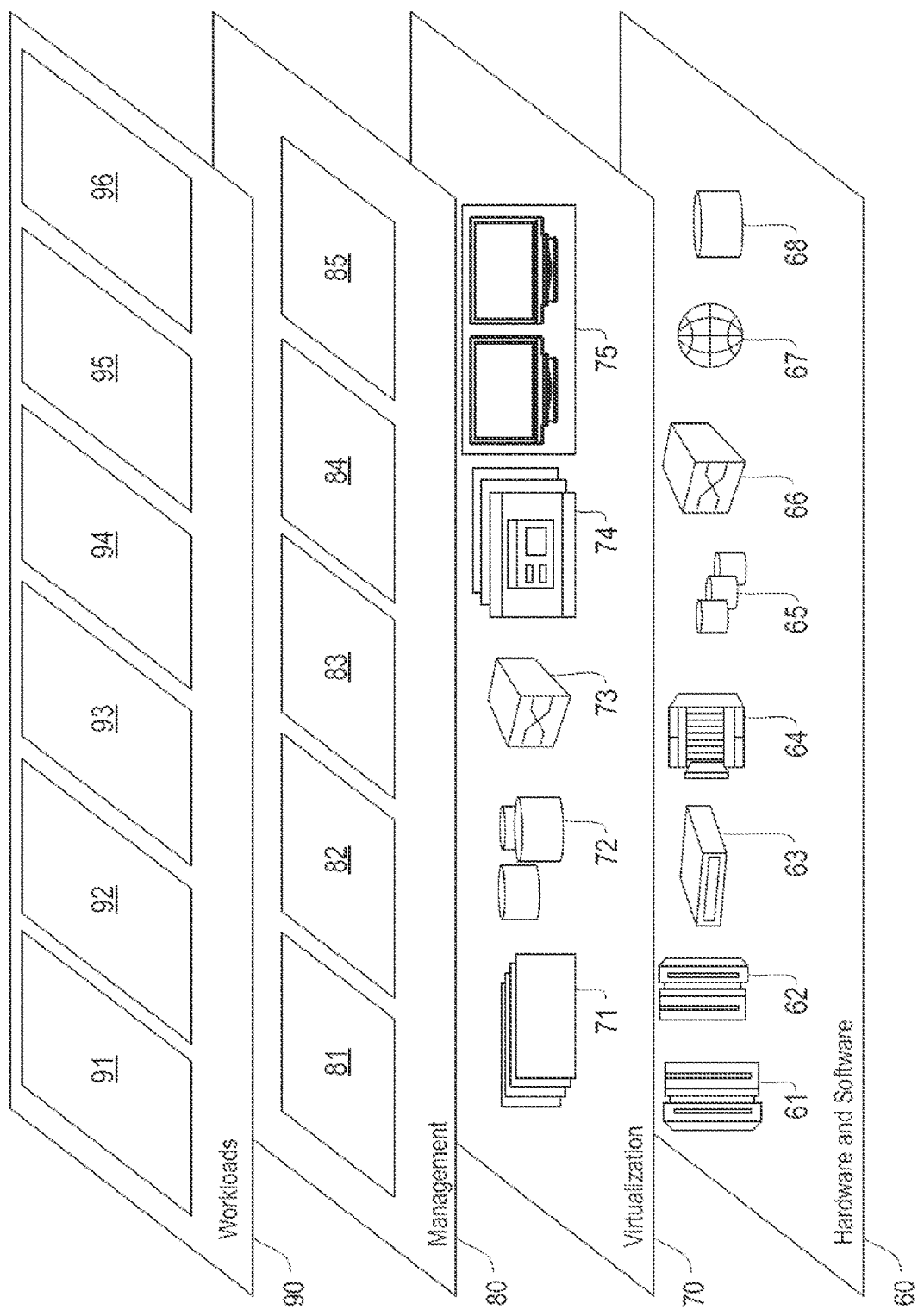
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and factchecking artificial intelligence models 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a technical effect of one or more of the example embodiments disclosed herein is providing an end-to-end automated system from creation and submission of AI models to the generation, standardization, verification of factsheets, and until the use of such AI models by consumers. Another technical effect of one or more of the example embodiments disclosed herein is providing a blockchain enabled marketplace for creating and validating the factsheets for AI models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining at least one artificial intelligence model and at least one set of data related to the at least one artificial intelligence model;
   determining a set of characteristics based at least in part on the at least one artificial intelligence model and the at least one set of data;
   selecting one of a plurality of networks based at least in part on a target deployment of the at least one artificial intelligence model to verify the set of characteristics, wherein each of the plurality of networks is associated with a respective set of verification entities;
   generating a report based at least in part on verifying the set of characteristics using the set of verification entities corresponding to the selected network, wherein the report establishes a threshold level of trust for the at least one artificial intelligence model; and storing the report on a blockchain associated with the selected network;
wherein the method is carried out by at least one computing device.

2. The computer-implemented method of claim 1, wherein the determining comprises:
   determining a set of features in the at least one set of data; and
   determining an impact of each feature within the set on the output of the at least one artificial intelligence model.

3. The computer-implemented method of claim 1, wherein the set of characteristics comprises at least one of:
   a description of the at least one artificial intelligence model;
   whether the at least one set of data complies with a set of regulations;
   one or more performance metrics for the at least one artificial intelligence model;
   one or more test results of the at least one artificial intelligence model;
   one or more biases in the set of data; and
   a lineage of the at least one data set.

4. The computer-implemented method of claim 1, comprising:
   obtaining feedback related to the selected network;
   training a machine learning model based at least in part on the feedback; and
   using the trained machine learning model for selecting a network from the plurality of networks for another artificial intelligence model.

5. The computer-implemented method of claim 1, wherein each of the verification entities comprises one or more of:
   at least one data provider that verifies the at least one dataset was used to train the artificial intelligence model;
   at least one regulatory authority that verifies the artificial intelligence model meets one or more specified regulations;
   at least one infrastructure provider that provides computing resources for verify at least a portion of the set of characteristics; and
   at least one verification agency that verifies capability of the at least one artificial intelligence model.

6. The computer-implemented method of claim 5, wherein the selecting is based at least in part on the computing resources provided by infrastructure providers in at least two of the networks.

7. The computer-implemented method of claim 1, wherein each of the plurality of networks is associated with different geographical regions.

8. The computer-implemented method of claim 1, wherein at least a portion of the set of characteristics are determined based on a factsheet provided by a builder of the at least one artificial intelligence model.

9. The computer-implemented method of claim 1, wherein the determining is based at least in part on feedback received for at least one other artificial intelligence model from another one of the plurality of networks.

10. The computer-implemented method of claim 1, wherein software is provided as a service in a cloud environment.

11. A computer program product comprising a computer readable storage medium having program instructions embodied therewith, the program instructions executable by a computing device to cause the computing device to:
   obtain at least one artificial intelligence model and at least one set of data related to the at least one artificial intelligence model;
   determine a set of characteristics based at least in part on the at least one artificial intelligence model and the at least one set of data;
   select one of a plurality of networks based at least in part on a target deployment of the at least one artificial intelligence model to verify the set of characteristics, wherein each of the plurality of networks is associated with a respective set of verification entities;
   generate a report based at least in part on verifying the set of characteristics using the set of verification entities corresponding to the selected network, wherein the report establishes a threshold level of trust for the at least one artificial intelligence model; and
   store the report on a blockchain associated with the selected network.

12. The computer program product of claim 11, wherein the determining comprises:
   determining a set of features in the at least one set of data; and
   determining an impact of each feature within the set on the output of the at least one artificial intelligence model.

13. The computer program product of claim 11, wherein the set of characteristics comprises at least one of:
   a description of the at least one artificial intelligence model;
   whether the at least one set of data complies with a set of regulations;
   one or more performance metrics for the at least one artificial intelligence model;
   one or more test results of the at least one artificial intelligence model;
   one or more biases in the set of data; and
   a lineage of the at least one data set.

14. The computer program product of claim 11, wherein the computing device is caused to:
   obtain feedback related to the selected network;
   train a machine learning model based at least in part on the feedback; and
   use the trained machine learning model for selecting a network from the plurality of networks for another artificial intelligence model.

15. The computer program product of claim 11, wherein each of the verification entities comprises one or more of:
   at least one data provider that verifies the at least one dataset was used to train the artificial intelligence model;
   at least one regulatory authority that verifies the artificial intelligence model meets one or more specified regulations;
   at least one infrastructure provider that provides computing resources for verify at least a portion of the set of characteristics; and
   at least one verification agency that verifies capability of the at least one artificial intelligence model.

16. The computer program product of claim 15, wherein the selecting is based at least in part on the computing resources provided by infrastructure providers in at least two of the networks.

17. The computer program product of claim 11, wherein each of the plurality of networks is associated with different geographical regions.

18. The computer program product of claim 11, wherein at least a portion of the set of characteristics are determined based on a factsheet provided by a builder of the at least one artificial intelligence model.

19. The computer program product of claim 11, wherein the determining is based at least in part on feedback received for at least one other artificial intelligence model from another one of the plurality of networks.

20. A system comprising:
a memory; and
at least one processor operably coupled to the memory and configured for:
obtaining at least one artificial intelligence model and at least one set of data related to the at least one artificial intelligence model;
determining a set of characteristics based at least in part on the at least one artificial intelligence model and the at least one set of data;
selecting one of a plurality of networks based at least in part on a target deployment of the at least one artificial intelligence model to verify the set of characteristics, wherein each of the plurality of networks is associated with a respective set of verification entities;
generating a report based at least in part on verifying the set of characteristics using the set of verification entities corresponding to the selected network, wherein the report establishes a threshold level of trust for the at least one artificial intelligence model; and
storing the report on a blockchain associated with the selected network.

* * * * *